Nov. 21, 1961 R. SKOFF 3,009,318

TURBOFAN ENGINE WITH REVERSIBLE PITCH FAN

Filed April 22, 1960 3 Sheets-Sheet 1

INVENTOR.
RAY SKOFF
BY Knox & Knox

TURBOFAN ENGINE WITH REVERSIBLE PITCH FAN

Filed April 22, 1960

INVENTOR.
RAY SKOFF
BY *Knox & Knox*

TURBOFAN ENGINE WITH REVERSIBLE PITCH FAN

Filed April 22, 1960 3 Sheets-Sheet 3

INVENTOR.
RAY SKOFF
BY
Knox & Knox

United States Patent Office 3,009,318

Patented Nov. 21, 1961

3,009,318

TURBOFAN ENGINE WITH REVERSIBLE PITCH FAN

Ray Skoff, San Diego, Calif., assignor to The Ryan Aeronautical Co., San Diego, Calif.

Filed Apr. 22, 1960, Ser. No. 24,132
12 Claims. (Cl. 60—35.6)

The present invention relates generally to aircraft jet engines and more particularly to a turbofan engine with reversible pitch fan.

The primary object of this invention is to provide a turbofan engine having a ducted fan powered by a free turbine mounted in the jet exhaust stream, the fan providing additional thrust and being reversible in pitch for thrust reversal.

Another object of this invention is to provide a turbofan engine in which the fan can be decoupled from the engine, so that normal jet thrust is used at high speed for maximum efficiency, the fan being used at low speeds at which the pure jet engine is inefficient.

Another object of this invention is to provide a turbofan engine in which pitch reversal of the fan is very rapid, allowing the fan to shift from reverse thrust to normal thrust virtually instantaneously in the event of an emergency.

A further object of this invention is to provide a turbine driven fan assembly which can be added to many existing types of jet engines, since the fan is not mechanically connected to the basic jet engine except for support.

Finally, it is an object to provide a turbofan engine of the aforementioned character which is simple and convenient to build and install and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

Figure 1:
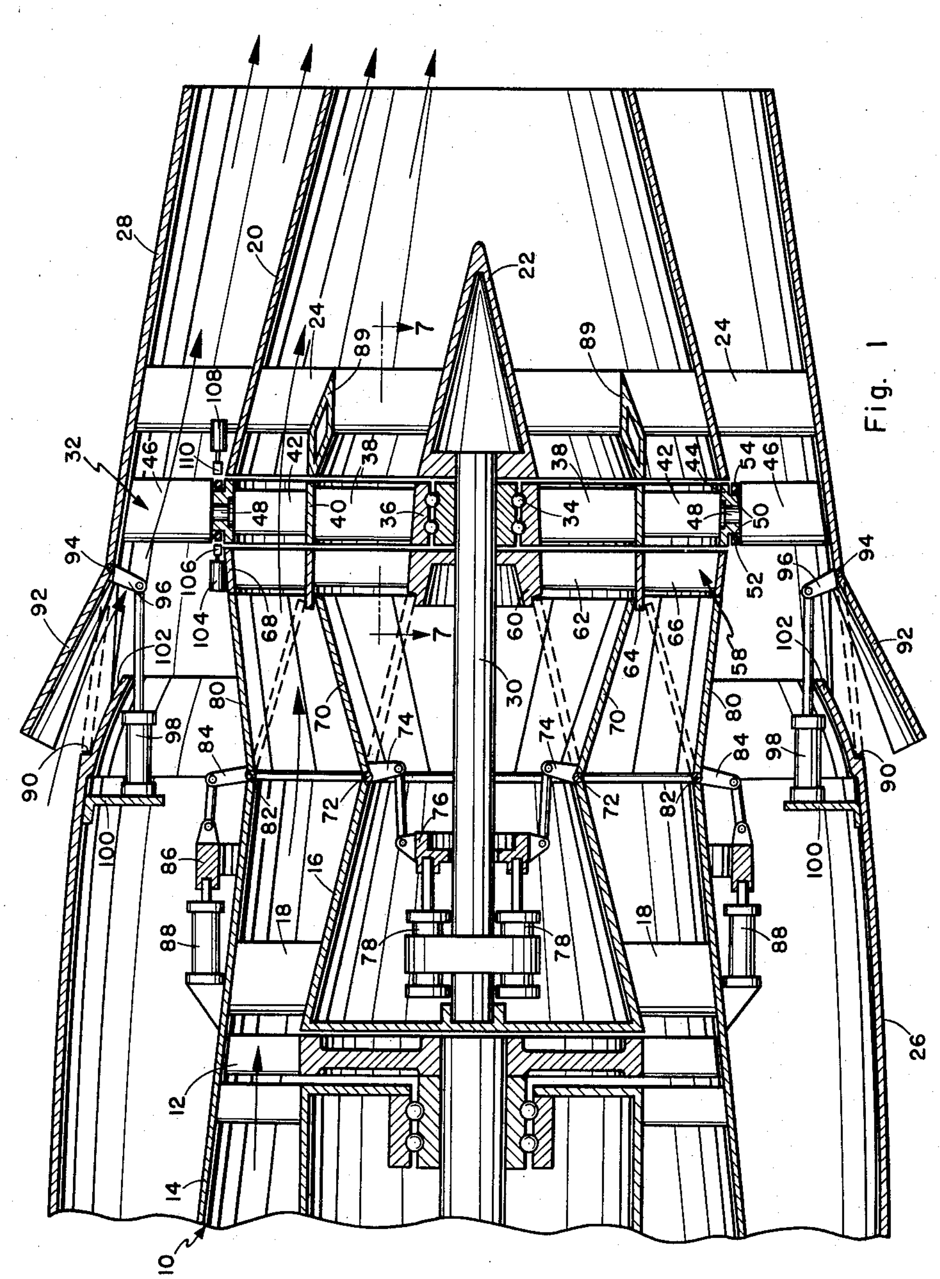
FIGURE 1 is a longitudinal section view, taken diametrically, showing the fan installation attached to the rear portion of a turbojet engine with the fan in operation.

The fan installation is used in conjunction with a conventional turbojet engine, indicated fragmentarily at 10, said engine having a power turbine 12 as the final stage thereof and a tailpipe 14 extending axially beyond the turbine. The remainder of the engine 10 can be of any well known configuration, the fan installation merely being mounted on the rear end of the engine to utilize the exhaust gas stream.

The fan installation includes a truncated cone housing 16 axially mounted rearwardly of the power turbine 12 and fixed within the tailpipe 14 by streamlined support struts 18. Spaced rearwardly of the cone housing 16 is a tapered, cylindrical nozzle 20 which is the final outlet for the exhaust gases, and axially mounted in the nozzle is a tail cone 22 held by support struts 24. The entire assembly is surrounded by an outer housing or nacelle 26 which may be part of the aircraft structure such as an engine nacelle or rear fuselage, the rear portion of said nacelle comprising a fan duct 28. The nozzle 20 is concentric with the fan duct 28 and is supported therein by continuations of the support struts 24. Axially mounted between the cone housing 16 and the tail cone 22 is a fixed shaft 30, and immediately forwardly of said tail cone is a fan wheel 32, freely rotatable about the fixed shaft on a bearing 34.

The fan wheel 32 comprises a hub 36 on which are a plurality of radially extending, streamlined vanes 38, the chords of which are parallel to the axis of shaft 30, said vanes supporting an inner turbine ring 40 carrying a plurality of turbine blades 42. Fixed to the tips of the turbine blades 42 is a shroud ring 44 concentric with the inner turbine ring 40 and equal in diameter to the forward end of the nozzle 30, so that gases passing through said turbine blades flow smoothly into the nozzle. Mounted on the outside of the shroud ring 44 are a plurality of fan blades 46, each held in place by an inwardly radially extending root pin 48 rotatably secured in said shroud ring. At the front and rear of the shroud ring 44 are peripheral grooves 50 in which are mounted front and rear connecting rings 52 and 54, respectively. The leading edges of the fan blades 46 are all pivotally attached to the front connecting ring 52 by retaining pins 56, while the trailing edges of said fan blades are similarly pivotally attached to the rear connecting ring 54 by further retaining pins 56.

Figures 6, 7:
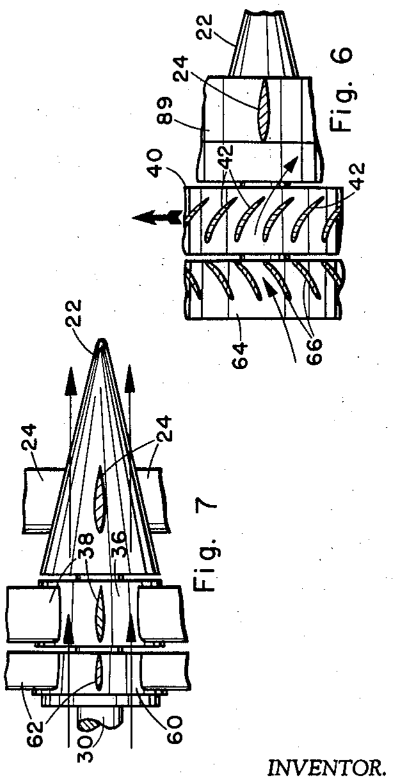
FIGURE 6 is a fragmentary sectional view taken on the line 6—6 of FIGURE 4.
FIGURE 7 is a fragmentary sectional view taken on the line 7—7 of FIGURE 1.

Immediately forwardly of the fan wheel 32 is a stator assembly 58 having a central hub 60 fixed to the shaft 30, a plurality of radial vanes 62 extending from said hub and supporting an inner stator ring 64 axially aligned with the inner turbine ring 40. The vanes 62 are streamlined in cross section and their chords are parallel to the axis of shaft 30, thus the vanes 38 and 62 are at zero pitch to the direction of gas flow, as in FIGURE 7, the central portions of the fan wheel 32 and stator assembly 58 being substantially open. Fixed to the inner stator ring 64 are a plurality of stator blades 66 shaped to direct the exhaust gases at the proper angle into the turbine blades 42, said stator blades being enclosed in an outer stator ring 68 axially aligned with the shroud ring 44.

Figures 2, 3:
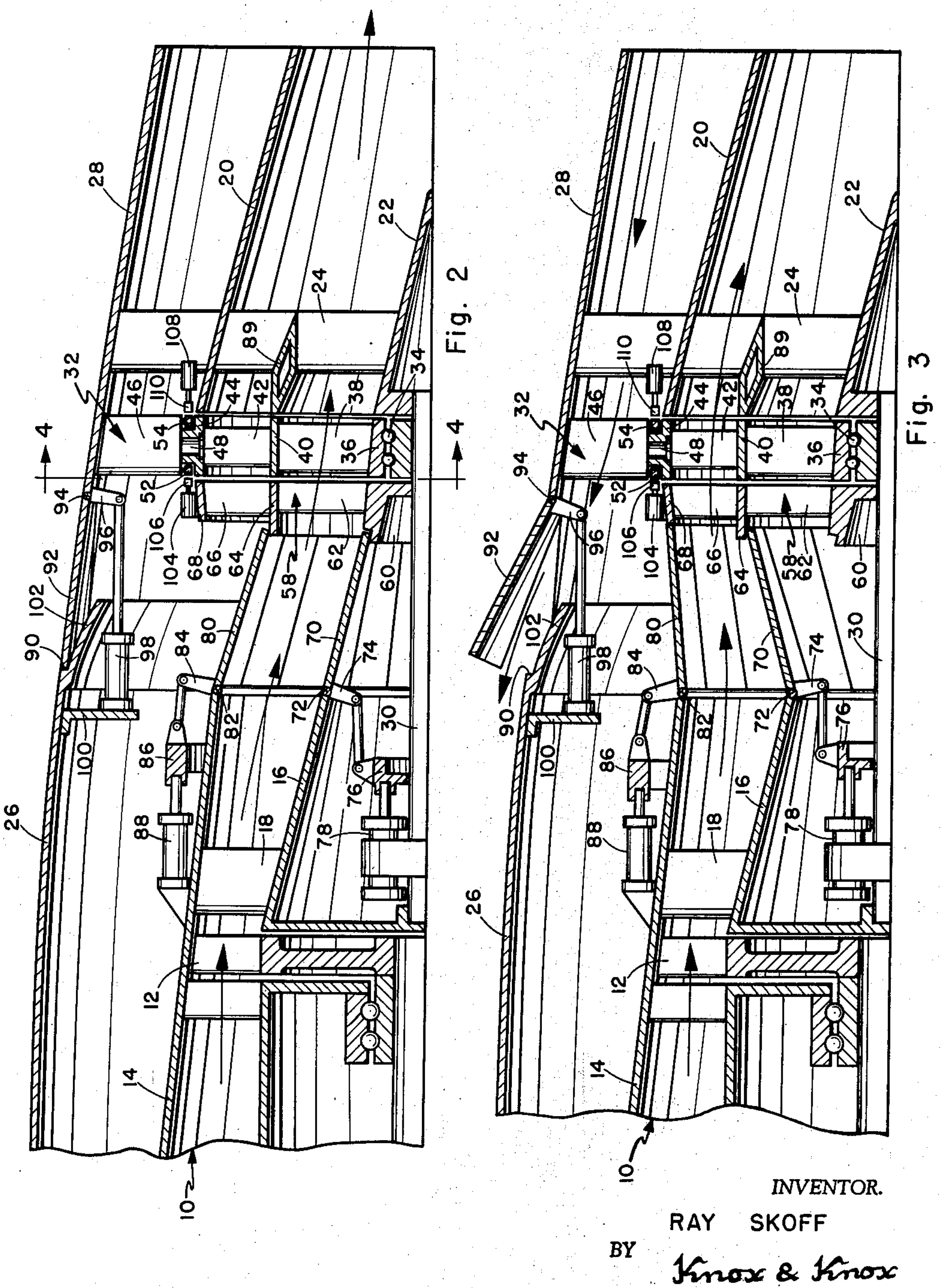
FIGURE 2 is a half sectional view similar to FIGURE 1 with the fan inoperative.
FIGURE 3 is a half sectional view similar to FIGURE 1 with the fan in reverse thrust position.
Figure 5:
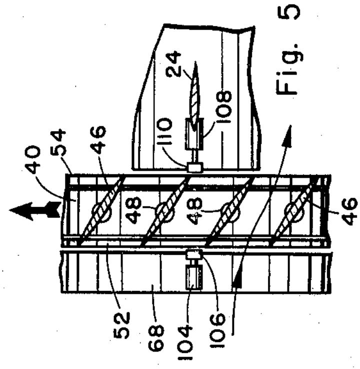
FIGURE 5 is a fragmentary sectional view taken on the line 5—5 of FIGURE 4.

Between the cone housing 16 and the fixed hub 60 are a plurality of inner flaps 70, forming an extension of said cone housing in closed position, as in FIGURE 2, said inner flaps being pivotally attached to the cone housing at their forward edges by hinges 72 to swing outwardly to an open position against the inner stator ring 64, as in FIGURE 3. The inner flaps 70 may be overlapped in the closed position and are dimensioned to form an unbroken continuation between the cone housing 16 and the inner stator ring 64 in the open position, the exact number of inner flaps and their arrangement being variable. The inner flaps 70 have inwardly extending actuating arms 74 which are pivotally connected to an actuating ring 76 concentric with fixed shaft 30, said actuating ring being coupled to jacks 78 for axial movement along said shaft, to open and close the inner flaps collectively.

Between the tailpipe 14 and the inner stator ring 64 are a plurality of outer flaps 80, pivotally attached to said tailpipe at their forward edges by hinges 82. The outer flaps 80 form a continuation between the tailpipe 14 and inner stator ring 64 in closed position, as in FIGURE 2 and extend between said tailpipe and the outer stator ring 68 in open position, as in FIGURE 3. The outer flaps 80 have outwardly extending actuating arms 84 pivotally connected to an actuating ring 86 concentric with the tailpipe 14, said actuating ring being coupled to jacks 88 to open and close the outer flaps collectively.

For maximum efficiency, it is desirable that the exhaust gases emerge through a nozzle to avoid expansion immediately at the rear face of the fan wheel 32. Since the exhaust gases have two paths of exit, through the inner vanes 38 or through the turbine blades 42, a nozzle ring 89 is mounted immediately rearwardly of and in concentric alignment with the inner turbine ring and supported by struts 24. The nozzle ring 89 is suitably shaped to provide the correct nozzle area reduction according to the required flow characteristics, the actual shape being variable.

The nacelle 26 is provided with a plurality of openings 90 forwardly of the fan assembly 32, said openings being fitted with outer doors 92 pivotally attached at their rear edges by hinges 94 to swing outwardly from the nacelle. The outer doors 92 have inwardly extending arms 96 connected to jacks 98, mounted on suitable brackets 100 in the nacelle. At the forward end of the openings 90 is an inwardly curving, annular lip 102 to guide air inwardly to the fan blades 46.

The jacks and associated linkage illustrated for operation of the inner flaps 70, outer flaps 80 and outer doors 92 are merely exemplary and various other types of actuating mechanisms may be used, according to available power sources.

Mounted on the outer stator ring 68 is an axially movable actuator 104 of any suitable type, such as hydraulic, pneumatic or solenoid operated, said actuator carrying a brake shoe 106 aligned with and normally spaced from the front connecting ring 52. Rearwardly of the shroud ring 44 is a further axially movable actuator 108, which can be attached to one of the support struts 24 or otherwise mounted on the nozzle 20, said actuator carrying a brake shoe 110 aligned with and normally spaced from the front connecting ring 52. Rearwardly of the shroud ring 44 is a further axially movable actuator 108, which can be attached to one of the support struts 24 or otherwise mounted on the nozzle 20, said actuator carrying a brake shoe 110 aligned with and normally spaced from the rear connecting ring 54.

In low speed operation, such as during take-off and climb of the aircraft, the fan is used to provide a large, low velocity airflow to add to the thrust of the jet engine. In this configuration, the inner flaps 70 and outer flaps 80 are open, forming an annular channel from the tailpipe 14 to the turbine blades 42, through the stator blades 66. The exhaust gases from the jet engine thus cause the fan wheel 32 to rotate freely on the fixed shaft 30. The outer doors 92 are open to allow ambient air to enter through the openings 90 and be expelled rearwardly by the fan blades 46 between the fan duct 28 and nozzle 20, as indicated by directional arrows in FIGURE 1. The large mass air flow at low velocity is more efficient at low speeds than the high velocity, small mass exhaust flow from the jet engine and greatly increases overall thrust. In addition, the high velocity jet exhaust is surrounded by an annular column of cool air moving at a lower speed and acting as an intermediate layer between the exhaust gases and ambient air. Since a large proportion of jet engine noise is due to the shearing effect of high velocity, hot gases through cold, still air, the airflow from the fan provides intermediate mixing and greatly reduces noise, a principle which has been proven in various types of noise suppressors for jet engines. This decrease in noise with an increase in thrust is particularly beneficial to take-off performance, where maximum thrust is required with a minimum of disturbance in the vicinity of the airport.

In high speed flight, the fan is less efficient and pure jet propulsion is more desirable. The inner flaps 70 and outer flaps 80 are closed, causing the engine exhaust gases to be ducted inside the inner stator ring 64 and inner turbine ring 40, to be ejected from the nozzle 20. Since the vanes 38 and 62 are at zero pitch, there is no rotational reaction on the fan wheel 32, the turbine blades 42 being cut off from the exhaust gases. The outer doors 92 are closed to shut off air supply to the fan blades 46 and all thrust is derived from the jet engine, as indicated by directional arrows in FIGURE 2.

Figure 8:
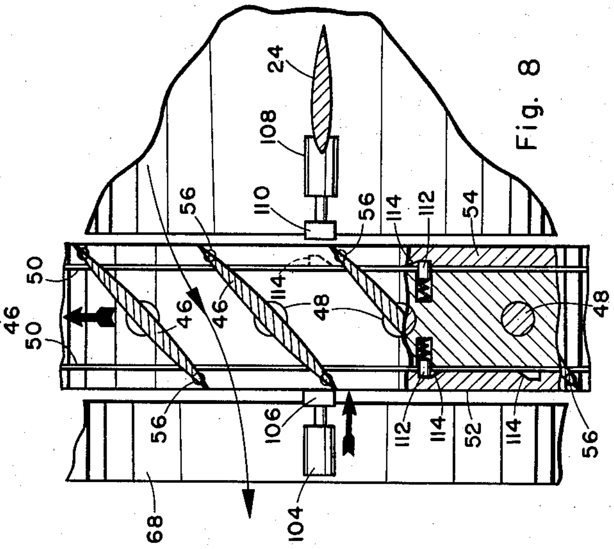
FIGURE 8 is an enlarged fragmentary sectional view, similar to FIGURE 5, showing the fan in reverse pitch.
Figure 4:
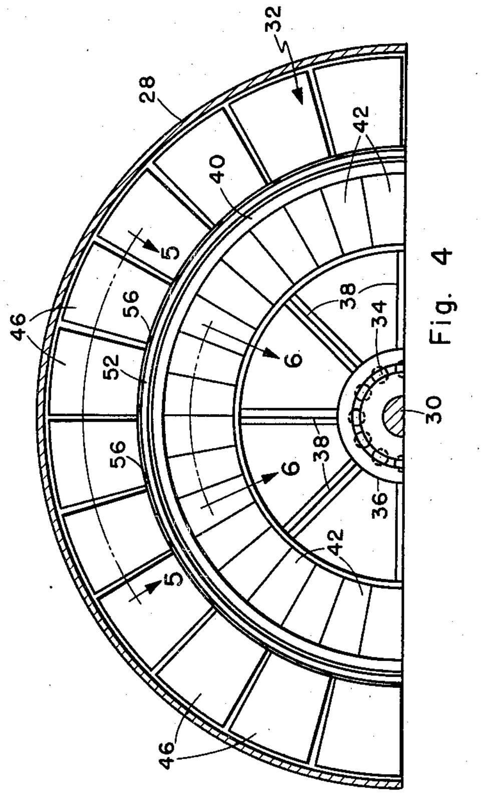
FIGURE 4 is a sectional view taken on the line 4—4 of FIGURE 2.

For landing purposes, the fan is once again brought into use. The inner flaps 70 and outer flaps 80 are opened to direct the exhaust gases through the turbine blades 42 and drive the fan wheel 32, the outer doors 92 also being opened for fan air flow. In landing, however, reduced thrust or braking thrust are desirable to reduce the length of landing run and for this purpose, the fan is shifted to reverse pitch. This is accomplished by energizing the actuator 104 and causing the brake shoe 106 to bear against the front connecting ring 52, as in FIGURE 8, the front connecting ring being retarded against rotation of the fan wheel and pulling the fan blades 40 around on their root pins 48 to a reversed pitch position. The actuator 104 need be operated only momentarily, the action being extremely rapid due to the high rotational speed of the fan. To ensure accurate pitch positioning of the fan blades 46, various stop mechanisms may be used, the simple type illustrated including spring biased limit stops 112 in the shroud ring 44, engageable in suitably spaced sockets 114 in the connecting rings 52 and 54. In reverse pitch position, the fan blades 46 draw air through the fan duct 28 and eject it forwardly through the openings 90, as indicated by directional arrows in FIGURE 3, the reversed thrust causing rapid deceleration of the aircraft.

It should be noted that whenever the exhaust gases are passing through the turbine blades 42 in the vicinity of actuators 104 and 108, the fan is also in operation, so that the actuators are cooled by the fan impelled air. When the fan is not in operation, the hot exhaust gases are conducted through the center portion of the fan wheel, clear of the actuators.

In the event that normal forward thrust is required in an emergency, the fan blades 46 are virtually instantaneously returned to forward pitch by energizing the rear actuator 108 and causing the brake shoe 110 to retard the rear connecting ring 54, so swinging all the fan blades collectively.

With the structure as illustrated the fan will draw some air from the space between the nacelle 26 and engine 10 and, in reverse pitch, will blow some air forwardly over the engine, with resultant cooling effects. If airflow around the engine is not required, the lip 102 may be extended to the outer stator ring 68, or other structure may be used to seal the forward interior of the nacelle. It should be understood that the structure illustrated is somewhat diagrammatic and can vary to suit particular engine and airframe combinations.

It is significant that the outer doors 92 are functional other than providing air to the fan. When the outer doors are open in the low speed configuration, the frontal area of the engine installation is at a maximum, but the additional drag of said outer doors is inconsequential at low speed. In the reverse thrust position, the drag of the outer doors 92 is beneficial in decreasing forward speed, while in high speed flight with the fan inoperative, the closed doors provide an aerodynamically smooth outer surface and reduce frontal area to a minimum.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. In combination with a turbojet engine having an exhaust gas conducting tailpipe, a turbofan assembly, comprising: a fan wheel having a plurality of peripherally spaced fan blades each pivotally mounted on a substantially radial axis; a turbine in said fan wheel; said fan wheel being freely rotatably mounted axially rearwardly of said tailpipe; said fan wheel having a substantially open centrol portion; gas flow control means mounted between said tailpipe and said fan wheel and being operable to control the flow of gases to said turbine and said open central portion, selectively; a duct enclosing said turbofan assembly; and actuating means operatively connected to said fan blades to shift the same selectively to forward and reverse pitch.

2. In combination with a turbojet engine having an exhaust gas conducting tailpipe, a turbofan assembly, comprising: a fan wheel having a plurality of peripherally spaced fan blades each pivotally mounted on a substantially radial axis; a turbine in said fan wheel; said fan wheel being freely rotatably mounted axially rearwardly of said tailpipe; said fan wheel having a substantially open central portion; gas flow control means mounted between said tailpipe and said fan wheel and being operable to control the flow of gases to said turbine and said open central portion, selectively; a duct enclosing said turbofan assembly; a nozzle concentrically mounted in said duct and positioned to contain the gases from said turbine; said fan blades being disposed between said nozzle and said duct; and actuating means operatively connected to said fan blades to shift the same selectively to forward and reverse pitch.

3. In combination with a turbojet engine having an exhaust gas conducting tailpipe, a turbofan assembly, comprising: a fan wheel freely rotatably mounted axially rearwardly of said tailpipe; said fan wheel having a hub, an inner ring and an outer shroud ring; a plurality of vanes securing said inner ring to said hub; said vanes being at zero pitch relative to the gas flow; a plurality of turbine blades fixed between said inner ring and said shroud ring; a plurality of fan blades pivotally mounted on the outer periphery of said shroud ring on generally radial axes; said fan blades beig adjustable to forward and reverse pitch; gas flow conducting flap means operatively mounted to conduct exhaust gases from said tailpipe to said turbine blades in an open position; operating means coupled to said flap means for moving the same to a second, closed position and conducting the exhaust gases between said vanes within said inner ring; and actuating means operatively connected to said fan blades to shift the same selectively to forward and reverse pitch.

4. A combination according to claim 3, wherein said actuating means includes a pair of connecting rings adjacent to and concentric with said shroud ring; one of said connecting rings being collectively pivotally attached to the leading edges of said fan blades; the other of said connecting rings being collectively pivotally attached to the trailing edges of said fan blades; brake means mounted adjacent to each of said connecting rings; and actuators coupled to said brake means to move the brake means into frictional contact with said connecting rings, whereby each of said connecting rings may be retarded selectively, causing rotation of said fan blades about their pivotal axes.

5. A combination according to claim 4 and including stop means engageable with said connecting rings to limit pitch change of said fan blades.

6. In combination with a turbojet engine having an exhaust gas conducting tailpipe, a turbofan assembly, comprising: a fan wheel freely rotatably mounted axially rearwardly of said tailpipe; said fan wheel having a hub, an inner ring and an outer shroud ring; a plurality of vanes securing said inner ring to said hub; said vanes being at zero pitch relative to the gas flow; a plurality of turbine blades fixed between said inner ring and said shroud ring; a plurality of fan blades pivotally mounted on the outer periphery of said shroud ring on generally radial axes; said fan blades being adjustable to forward and reverse pitch; gas flow conducting flap means operatively mounted to conduct exhaust gases from said tailpipe to said turbine blades in an open position; operating means coupled to said flap means for moving the same to a second, closed position and conducting the exhaust gases between said vanes within said inner ring; a duct enclosing said turbofan assembly and extending axially rearwardly therefrom; said duct having doors therein operative to vent said fan blades to ambient air; a rearwardly opening nozzle concentrically mounted in said duct in axial alignment with said shroud ring to contain the exhaust gases from said turbine blades; and actuating means operatively connected to said fan blades to shift the same selectively to forward and reverse pitch.

7. In combination with a turbojet engine having an exhaust gas conducting tailpipe, a turbofan assembly, comprising: a fan wheel freely rotatably mounted axially rearwardly of said tailpipe; said fan wheel having a hub, an inner ring and an outer shroud ring; a plurality of vanes securing said inner ring to said hub; said vanes being at zero pitch relative to the gas flow; a plurality of turbine blades fixed between said inner ring and said shroud ring; a plurality of fan blades pivotally mounted on the outer periphery of said shroud ring on generally radial axes; said fan blades being adjustable to forward and reverse pitch; gas flow conducting flap means operatively mounted to conduct exhaust gases from said tailpipe to said turbine blades in an open position; operating means coupled to said flap means for moving the same to a second, closed position and conducting the exhaust gases between said vanes within said inner ring; a duct enclosing said turbofan assembly and extending axially rearwardly therefrom; said duct having doors therein operative to vent said fan blades to ambient air; a rearwardly opening nozzle concentrically mounted in said duct in axial alignment with said shroud ring to contain the exhaust gases from said turbine blades; a pair of connecting rings concentric with and adjacent to the outer periphery of said shroud ring; the leading edges of said fan blades being operatively pivotally attached to one of said connecting rings; the trailing edges of said fan blades being operatively pivotally connected to the other of said connecting rings; brake means mounted adjacent to each of said connecting rings; actuators coupled to said brake means to move the brake means into frictional contact with said connecting rings, whereby each of the connecting rings may be retarded selectively, causing rotation of said fan blades about their pivotal axes; and stops engageable with said connecting rings to limit pitch change of said fan blades.

8. In combination with a turbojet engine having an exhaust gas conducting tailpipe, a turbofan assembly, comprising: a fan wheel having a plurality of peripherally spaced fan blades each pivotally mounted on a substantially radial axis; a turbine in said fan wheel; said fan wheel being freely rotatably mounted axially rearwardly of said tailpipe; said fan wheel having a substantially open portion permitting virtually unimpeded gas flow therethrough; gas flow conducting means operatively mounted between said tailpipe and said fan wheel and shiftable to conduct gases selectively to said turbine and to said open portion; and actuating means operatively connected to said fan blades to shift the same selectively to forward and reverse pitch.

9. In combination with a turbojet engine having an exhaust gas conducting tailpipe, a turbofan assembly, comprising: a fan wheel having a plurality of peripherally spaced fan blades each pivotally mounted on a substantially radial axis; a turbine in said fan wheel; said fan wheel being freely rotatably mounted axially rearwardly of said tailpipe; said fan wheel having a substantially open inner portion permitting virtually unimpeded gas flow therethrough and disposed radially inside said turbine; gas flow conducting means operatively mounted between said tailpipe and said fan wheel and shiftable to conduct gases selectively to said turbine and to said open inner portion; and actuating means operatively connected to said fan blades to shift the same selectively to forward and reverse pitch.

10. In combination with a turbojet engine having an exhaust gas conducting tailpipe, a turbofan assembly, comprising: a fan wheel having a plurality of peripherally spaced fan blades each pivotally mounted on a substantially radial axis; a turbine in said fan wheel; said fan wheel being freely rotatably mounted axially rearwardly of said tailpipe; said fan wheel having a substantially open portion permitting virtually unimpeded gas flow therethrough; a stator assembly mounted immediately forwardly of said fan wheel and having a plurality of stator blades positioned to direct gases to said turbine; said stator assembly having a generally open portion corresponding to the open portion of said fan wheel; gas flow conducting means operatively mounted between said tailpipe and said stator assembly and shiftable to conduct gases selectively to said turbine through said stator blades and through said open portions; and actuating means operatively connected to said fan blades to shift the same selectively to forward and reverse pitch.

11. In combination with a turbojet engine having an exhaust gas conducting tailpipe, a turbofan assembly, comprising: a fan wheel having a plurality of peripherally spaced fan blades each pivotally mounted on a substantially radial axis; a turbine in said fan wheel; said fan wheel being freely rotatably mounted axially rearwardly of said tailpipe; said fan wheel having a substantially open inner portion permitting virtually unimpeded gas flow therethrough and disposed radially inside said turbine; a stator assembly mounted immediately forwardly of said fan wheel and having a plurality of stator blades positioned to direct gases to said turbine; said stator assembly having substantially open inner portion corresponding to the open inner portion of said fan wheel; gas flow conducting means operatively mounted between said tailpipe and said stator assembly and shiftable to conduct gases selectively to said turbine through said stator blades and through said open inner portions; and actuating means operatively connected to said fan blades to shift the same selectively to forward and reverse pitch.

12. In combination with a turbojet engine having an exhaust gas conducting tailpipe, a turbofan assembly, comprising: a fan wheel freely rotatably mounted axially rearwardly of said tailpipe; said fan wheel having a hub, an inner ring and an outer shroud ring; a plurality of vanes securing said inner ring to said hub; said vanes being at zero pitch relative to the gas flow; a plurality of turbine blades fixed between said inner ring and said shroud ring; a plurality of fan blades pivotally mounted on the outer periphery of said shroud ring on generally radial axes; said fan blades being adjustable to forward and reverse pitch; a stator assembly fixedly mounted immediately forwardly of said fan wheel; said stator assembly having a ring of stator blades positioned to direct gases to said turbine blades; said stator assembly including a hub having a plurality of generally radially extending fixed vanes supporting said ring of stator blades; said fixed vanes being at zero pitch relative to the gas flow; gas flow conducting flap means operatively mounted to conduct exhaust gases from said tailpipe to said stator blades in one open position; operating means coupled to said flap means for moving the same to a second closed position and conducting the exhaust gases within said ring of stator blades and said inner ring, between said vanes; and actuating means operatively connected to said fan blades to shift the same selectively to forward and reverse pitch.

References Cited in the file of this patent

UNITED STATES PATENTS

| | | |
|---|---|---|
| 1,779,050 | Schroder | Oct. 21, 1930 |
| 2,527,732 | Imbert | Oct. 31, 1950 |
| 2,587,649 | Pope | Mar. 4, 1952 |
| 2,663,494 | Burkland | Dec. 27, 1953 |
| 2,692,724 | McLeod | Oct. 26, 1954 |

FOREIGN PATENTS

| | | |
|---|---|---|
| 434,735 | Italy | May 4, 1948 |
| 586,572 | Great Britain | Mar. 24, 1947 |
| 866,145 | Germany | Feb. 9, 1953 |